US011861484B2

(12) United States Patent
Bai et al.

(10) Patent No.: US 11,861,484 B2
(45) Date of Patent: Jan. 2, 2024

(54) NEURAL PROCESSING UNIT (NPU) DIRECT MEMORY ACCESS (NDMA) HARDWARE PRE-PROCESSING AND POST-PROCESSING

(71) Applicant: QUALCOMM Incorporated, San Diego, CA (US)

(72) Inventors: Jinxia Bai, San Diego, CA (US); Rosario Cammarota, San Diego, CA (US); Michael Goldfarb, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1200 days.

(21) Appl. No.: 16/147,189

(22) Filed: Sep. 28, 2018

(65) Prior Publication Data
US 2020/0104690 A1 Apr. 2, 2020

(51) Int. Cl.
*G06F 15/78* (2006.01)
*G06N 3/063* (2023.01)
*G06F 9/30* (2018.01)

(52) U.S. Cl.
CPC ......... *G06N 3/063* (2013.01); *G06F 9/30098* (2013.01); *G06F 15/7825* (2013.01)

(58) Field of Classification Search
CPC ..... G06N 3/063; G06F 13/28; G06F 9/30098; G06F 15/7825
See application file for complete search history.

(56) References Cited

U.S. PATENT DOCUMENTS

| 10,592,250 B1* | 3/2020 | Diamant | G06F 9/3802 |
|---|---|---|---|
| 2012/0116746 A1* | 5/2012 | Papariello | G06F 30/20 |
| | | | 703/21 |
| 2017/0124166 A1* | 5/2017 | Thomas | H04L 69/22 |
| 2018/0046913 A1* | 2/2018 | Yu | G06N 3/0454 |
| 2018/0276035 A1* | 9/2018 | Henry | G06N 3/04 |
| 2018/0300165 A1* | 10/2018 | Johnson | G06F 9/45558 |
| 2019/0287235 A1* | 9/2019 | Ikeda | G06T 7/0008 |
| 2019/0294959 A1* | 9/2019 | Vantrease | G06N 3/063 |
| 2019/0340491 A1* | 11/2019 | Norden | G06N 3/08 |
| 2020/0089506 A1* | 3/2020 | Power | G06N 3/063 |

* cited by examiner

*Primary Examiner* — Jacob Petranek
(74) *Attorney, Agent, or Firm* — QUALCOMM Incorporated

(57) ABSTRACT

A neural processing unit (NPU) is described. The NPU includes an NPU direct memory access (NDMA) core. The NDMA core includes a read engine having a read buffer. The NDMA core also includes a write engine having a write buffer. The NPU also includes a controller. The controller is configured to direct the NDMA core to perform hardware pre-processing of NDMA data in the read buffer and post-processing of NDMA data in the write buffer on blocks of a data stripe to process tensors in artificial neural networks.

22 Claims, 11 Drawing Sheets

NEURAL PROCESSING UNIT (NPU) DIRECT MEMORY ACCESS (NDMA) HARDWARE PRE-PROCESSING AND POST-PROCESSING

BACKGROUND

Field

Certain aspects of the present disclosure generally relate to convolutional neural networks and, more particularly, to neural processing unit (NPU) direct memory access (NDMA) hardware pre-processing and post-processing of NDMA data for artificial neural networks.

Background

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

In layered neural network architectures, the output of a first layer of neurons becomes an input to a second layer of neurons, the output of a second layer of neurons becomes an input to a third layer of neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

Convolutional neural networks, however, tend to shrink input features during computations through the various network layers. Shrinking of the input feature size during computations fails to preserve an original size of the input features. Input feature padding may be used to preserve the input feature size during computations though the neural network layers. Although input feature padding preserves the input feature size, processing of the padded values unduly increases memory bandwidth utilization in convolutional neural networks.

SUMMARY

A neural processing unit (NPU) is described. The NPU includes an NPU direct memory access (NDMA) core. The NDMA core includes a read engine having a read buffer. The NDMA core also includes a write engine having a write buffer. The NPU also includes a controller. The controller is configured to direct the NDMA core to perform hardware pre-processing of NDMA data in the read buffer and post-processing of NDMA data in the write buffer on blocks of a data stripe to process tensors in artificial neural networks.

A method for hardware pre-processing and post-processing of direct memory access (DMA) data in artificial neural networks is described. The method includes programming configuration registers of a neural processing unit (NPU) direct memory access (NDMA) core for a read client and/or a write client. The method also includes streaming data blocks of a data stripe to/from an external memory of the NDMA core. The method further includes pre-processing and post-processing the data blocks in a buffer of the NDMA core during streaming of the data blocks.

A non-transitory computer-readable medium having program code recorded thereon for hardware pre-processing and post-processing of direct memory access (DMA) data in an artificial neural network is described. The program code is executed by a processor. The program code includes program code to program configuration registers of a neural processing unit (NPU) direct memory access (NDMA) core for a read client and/or a write client. The program code also includes program code to stream data blocks of a data stripe to/from an external memory of the NDMA core. The program code further includes program code to pre-process and post-process the data blocks of the data stripe in a buffer of the NDMA core during streaming of the data blocks of the data stripe.

This has broadly outlined the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
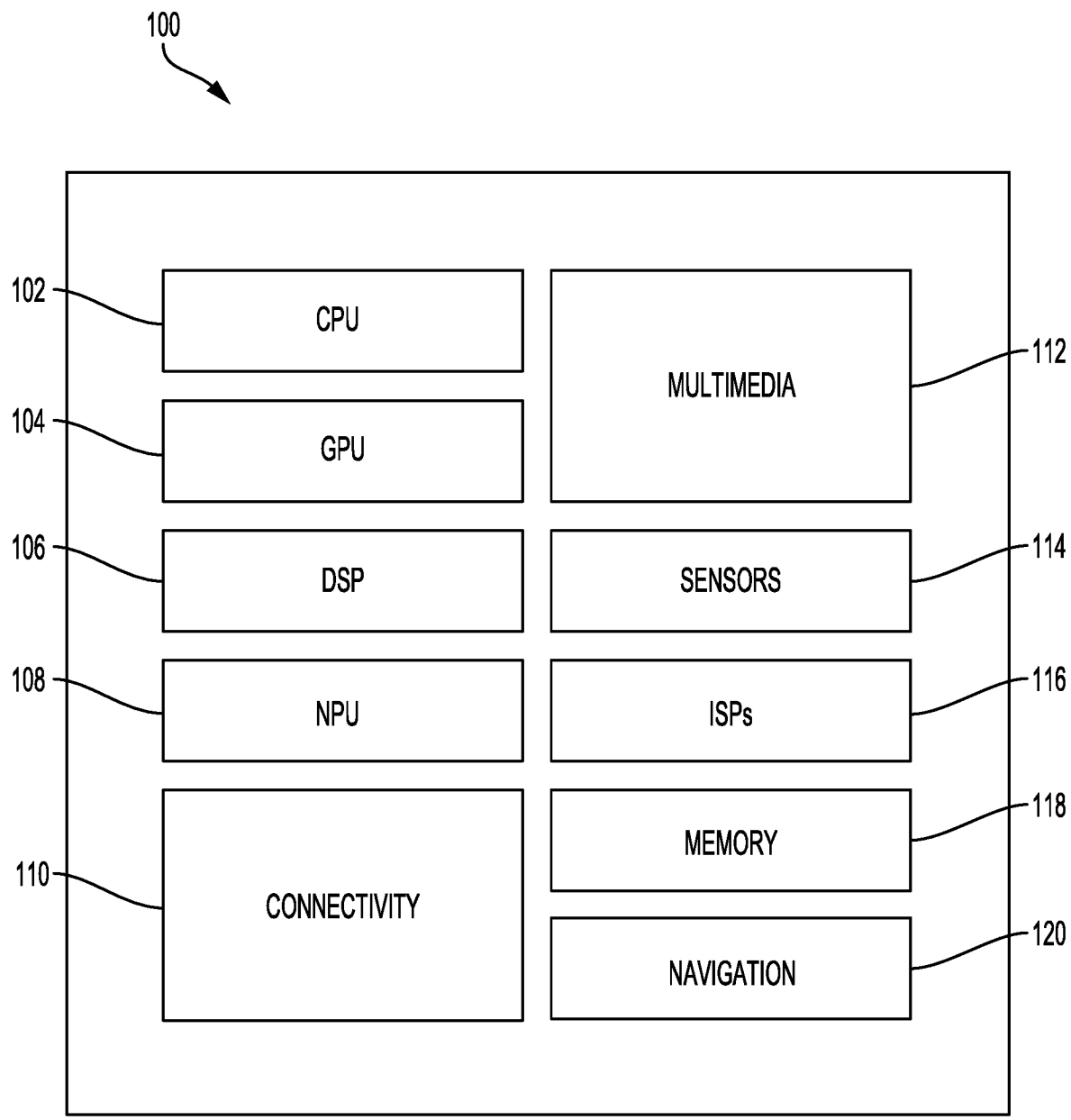
FIG. 1 illustrates an example implementation of a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Artificial neural networks, having either convolutional or fully connected layers, enable processing for image recognition, object detection, and natural language processing. These features also enable support for autonomous driving applications as well as content-aware camera processing. Deep convolutional neural networks (DCNNs) have promising applications in emerging embedded, wearable, and Internet of Things (IoT) markets.

In operation, a deep convolutional neural network (or DCNN) may be composed of a large number of weight tensors multiplied by activation tensors. These weight tensors and activation tensors enable multiplying of input data by weights in various filters of the DCNN. In a previous layer of the DCNN, the activation tensors may be fed through nonlinear functions. In operation, processing in DCNNs generally involves convolution of weight tensors and activation tensors to perform tasks. DCNNs, therefore, consume significant computing power performing convolution of the large number of weight tensors and activation tensors.

Deep convolutional neural networks, however, tend to shrink input features during computations through the various network layers. Shrinking of the input feature size during computations fails to preserve an original size of the input features. Input feature padding may be used to preserve the input feature size during computations though the neural network layers. Although input feature padding preserves the input feature size, processing of the padded values unduly increases memory bandwidth utilization in deep convolutional neural networks. Additional pre-processing and post-processing operations performed on activation tensors may include data cropping as well as data conversion, which unduly increase memory bandwidth utilization in deep convolutional neural networks.

Aspects of the present disclosure are directed to neural processing unit (NPU) direct memory access (NDMA) hardware pre-processing and post-processing of NDMA data for convolutional neural networks (CNNs). Adding hardware pre-processing and post-processing capability reduces memory bandwidth pressure and wasted cycles in compute units of an NPU. As described, the term NDMA data may refer to data (e.g., image data, activation tensors, or other like convolutional data) moved from main memory to storage closer to the compute units of an NPU (e.g., read clients and/or write clients). NDMA hardware pre-processing and post-processing is software programmable, which ultimately results in better resource utilization and energy efficiency. In aspects of the present disclosure, programmability of the hardware pre-processing and post-processing capability is provided at a grain level of a layer in the neural network.

FIG. 1 illustrates an example implementation of a system-on-a-chip (SOC) 100, which may include a neural processing unit (NPU) 108 or a multi-core NPU configured to perform hardware pre-processing and post-processing of NDMA data in accordance with certain aspects of the present disclosure. Variables (e.g., neural signals and synaptic weights), system parameters associated with a computational device (e.g., neural network with weights), delays, frequency bin information, and task information may be stored in a memory block associated with an NPU 108, in a memory block associated with a central processing unit (CPU) 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The NPU 108 may be based on an ARM instruction set. In an aspect of the present disclosure, the instructions loaded into the NPU 108 may comprise program code to program configuration registers of a neural processing unit (NPU) direct memory access (NDMA) core for a read client and/or a write client. The instructions loaded into the NPU 108 may also comprise program code to stream data blocks of a data stripe to/from an external memory of the NDMA core. In addition, the instructions loaded into the NPU 108 may comprise program code to pre-process and post-process the data blocks in a buffer of the NDMA core during streaming of the data blocks.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
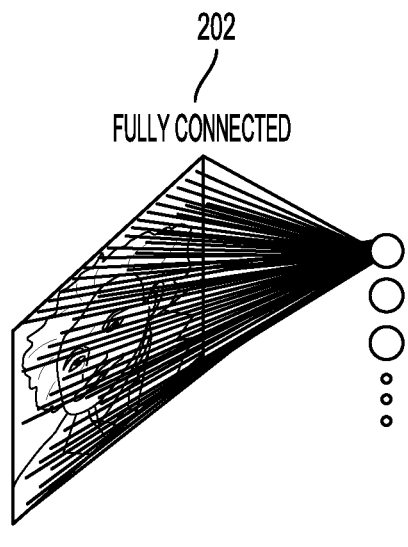
FIGS. 2A, 2B, and 2C are diagrams illustrating a neural network, in accordance with aspects of the present disclosure.
Figure 2B:
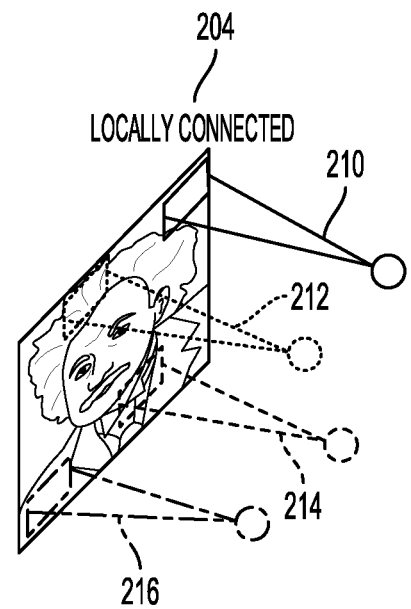

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connection strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
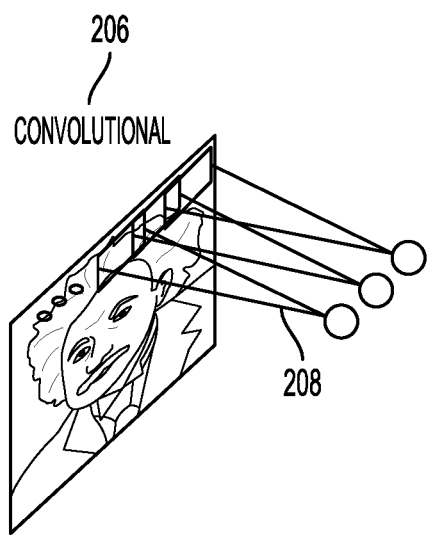

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
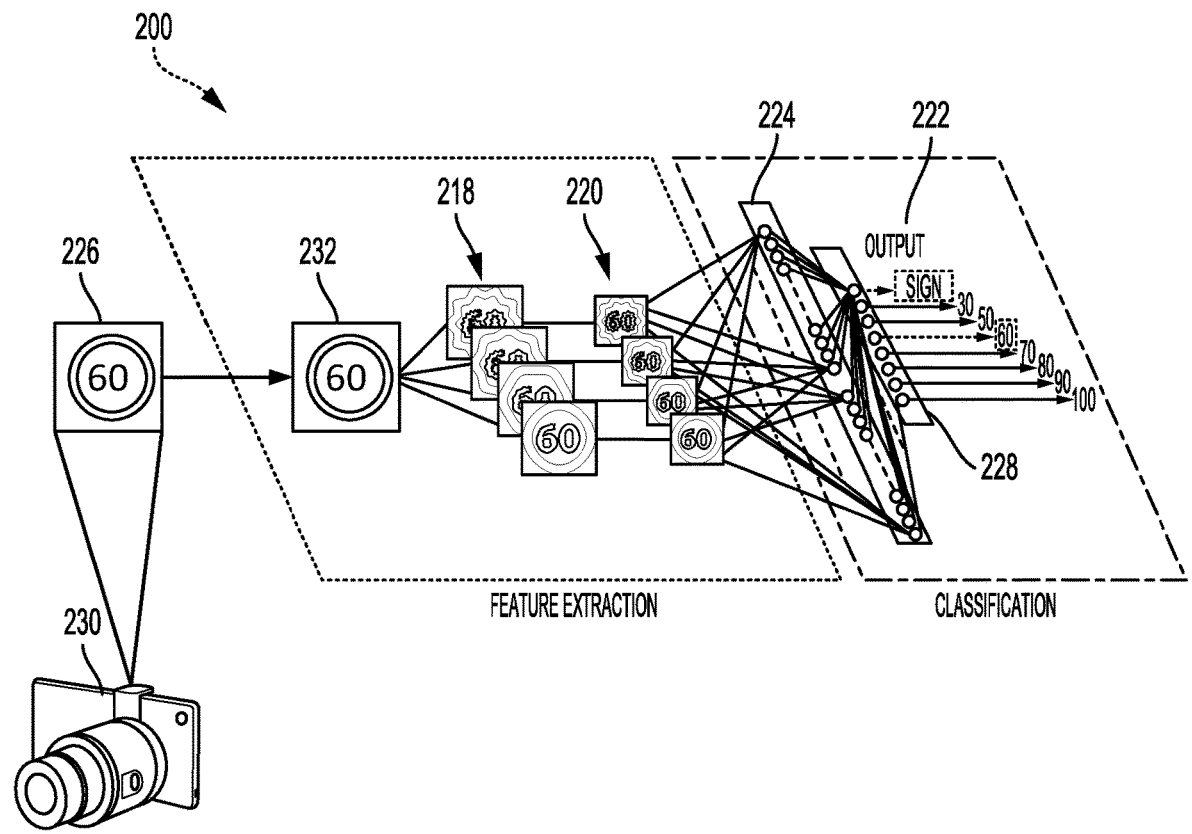
FIG. 2D is a diagram illustrating an exemplary deep convolutional neural network (DCNN), in accordance with aspects of the present disclosure.

One type of convolutional neural network is a deep convolutional neural network (DCNN). FIG. 2D illustrates a detailed example of a DCNN 200 designed to recognize visual features from an image 226 input from an image capturing device 230, such as a car-mounted camera. The DCNN 200 of the current example may be trained to identify traffic signs and a number provided on the traffic sign. Of course, the DCNN 200 may be trained for other tasks, such as identifying lane markings or identifying traffic lights.

The DCNN 200 may be trained with supervised learning. During training, the DCNN 200 may be presented with an image, such as the image 226 of a speed limit sign, and a forward pass may then be computed to produce an output 222. The DCNN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, four different convolutional kernels were applied to the image 226 at the convolutional layer 232 because four different feature maps are generated in the first set of feature maps 218. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCNN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCNN 200 is likely to be incorrect. Thus, an error may be calculated between the output 222 and a target output. The target output is the ground truth of the image 226 (e.g., "sign" and "60"). The weights of the DCNN 200 may then be adjusted so the output 222 of the DCNN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCNN may be presented with new images (e.g., the speed limit sign of the image 226) and a forward pass through the network may yield an output 222 that may be considered an inference or a prediction of the DCNN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional neural networks (DCNNs) are networks of convolutional networks, configured with additional pooling and normalization layers. DCNNs have achieved state-of-the-art performance on many tasks. DCNNs can be trained using supervised learning in which both the input and output targets are known for many exemplars and are used to modify the weights of the network by use of gradient descent methods.

DCNNs may be feed-forward networks. In addition, as described above, the connections from a neuron in a first layer of a DCNN to a group of neurons in the next higher layer are shared across the neurons in the first layer. The feed-forward and shared connections of DCNNs may be exploited for fast processing. The computational burden of a DCNN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
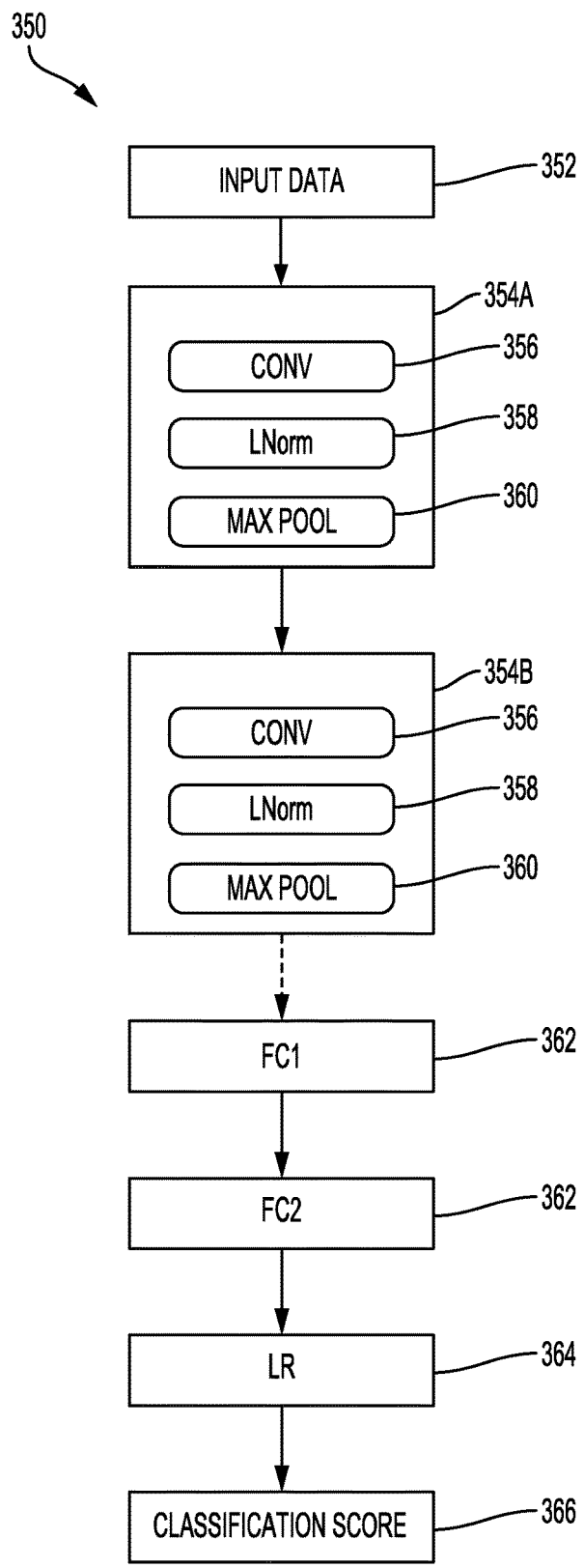
FIG. 3 is a block diagram illustrating an exemplary deep convolutional neural network (DCNN), in accordance with aspects of the present disclosure.

FIG. 3 is a block diagram illustrating a deep convolutional neural network 350. The deep convolutional neural network 350 may include multiple different types of layers based on connectivity and weight sharing. As shown in FIG. 3, the deep convolutional neural network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional neural network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional neural network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional neural network 350 may access other processing blocks that may be present on the SOC 100, such as the sensor processor 114 and navigation module 120, dedicated, respectively, to sensors and navigation.

The deep convolutional neural network 350 may also include one or more fully connected layers 362 (FC1 and FC2). The deep convolutional neural network 350 may further include a logistic regression (LR) layer 364. Between each layer 356, 358, 360, 362, 364 of the deep convolutional neural network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional neural network 350 to learn hierarchical feature representations from input data 352 (e.g., images, audio, video, sensor data, and/or other input data) supplied at the first of the convolution blocks 354A. The output of the deep convolutional neural network 350 is a classification score 366 for the input data 352. The classification score 366 may be a set of probabilities, where each probability is the probability of the input data including a feature from a set of features.

Figure 4:
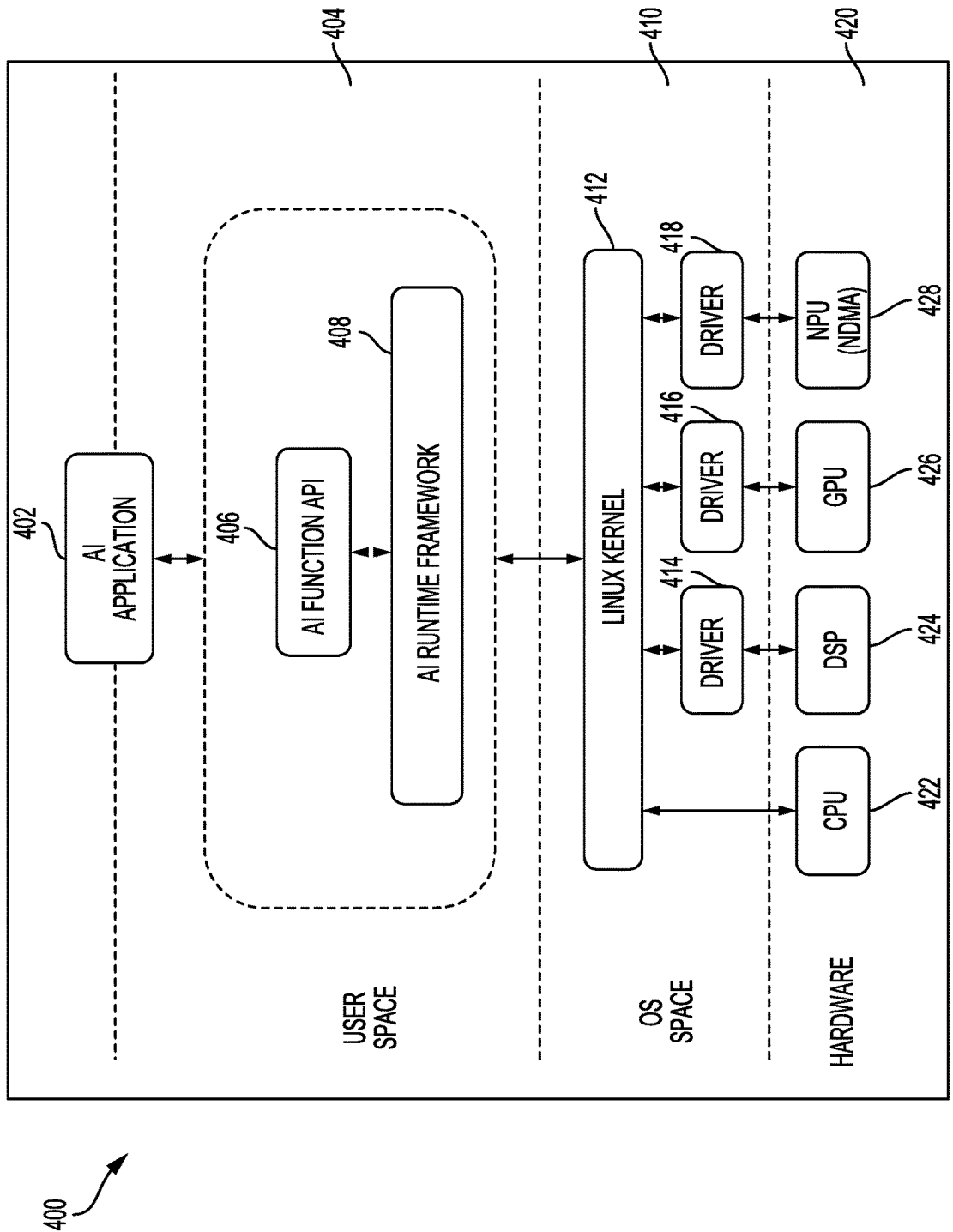
FIG. 4 is a block diagram illustrating an exemplary software architecture that may modularize artificial intelligence (AI) functions, in accordance with aspects of the present disclosure.

FIG. 4 is a block diagram illustrating an exemplary software architecture 400 that may modularize artificial intelligence (AI) functions. Using the architecture, applications may be designed that may cause various processing blocks of an SOC 420 (for example a CPU 422, a DSP 424, a GPU 426, and/or an NPU 428) to support hardware pre-processing and post-processing of NPU direct memory access (NDMA) during run-time operation of an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space 410, such as a Linux Kernel 412, running on the SOC 420. The operating system, in turn, supports hardware pre-processing and post-processing of NDMA data performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

Referring again to FIG. 1, the SOC 100 includes a neural processing unit (NPU) 108 or a multi-core NPU configured to perform hardware pre-processing and post-processing of NPU direct memory access (NDMA) data, in accordance with certain aspects of the present disclosure. In aspects of the present disclosure, an NDMA core of the NPU 108 is configured to move substantial chunks of data (e.g., an image frame of one-dimensional (1D), two-dimensional (2D), or three-dimensional (3D) data and/or activation tensors). In aspects of the present disclosure, the NDMA core moves the data chunks in and out of an array of compute elements of the NPU 108 (e.g., read clients and/or write clients) by streaming the data. During streaming of the data, the NDMA core may perform hardware pre-processing and post-processing during reading/writing of the data streaming to/from client buffers.

In aspects of the present disclosure, streaming of data refers to movement of data in a stripe, block by block, in response to a single NDMA command. That is, streaming of data moves a small block (e.g., 1D, 2D, or 3D) at a time, and continues by moving another block after a period of time (e.g., to receive a bus grant signal). This process is repeated until a stripe of data is moved to/from a client buffer. In this example, the block size is programmable, which will generally be larger than a bus transaction size. In aspects of the present disclosure, the NDMA core of the NPU 108 can be configured to move a stripe of data (e.g., multiple blocks), for example as shown in FIGS. 5A, 5B, and 5C.

Figure 5A:
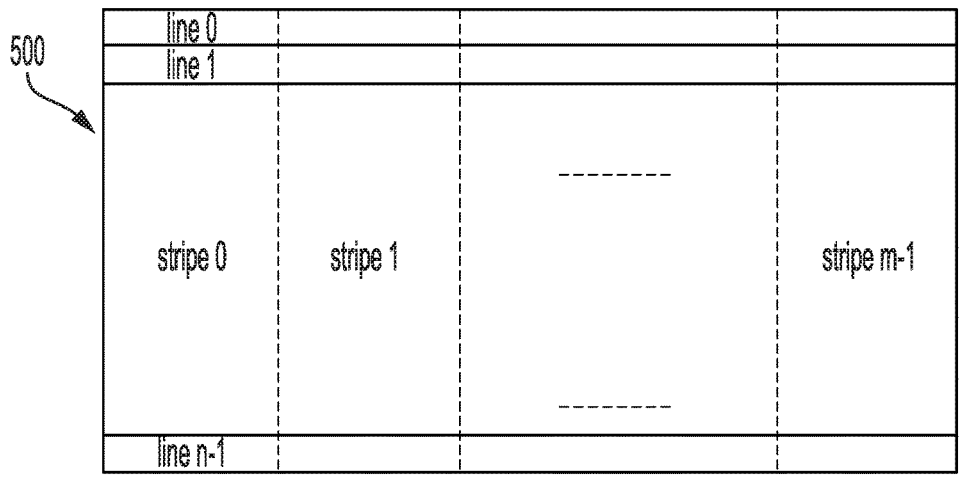
FIG. 5A is a block diagram of an image partitioned into M-stripes, according to aspects of the present disclosure.

FIG. 5A is a block diagram of an image 500 partitioned into M-stripes, according to aspects of the present disclosure. Traditional streaming retrieves a chunk of memory aligned with the boundaries of main memory and stores the chunk of memory locally. Aspects of the present disclosure recognize that tensor computations in deep learning neural networks generally do not involve the entire chunk of memory, such as the image 500. Generally, a subset of the chunk of data is used for tensor computation in deep learning neural networks. According to aspects of the present disclosure, this subset of data may be a stripe of the image 500.

As described, striping is a data processing technique in which an image 500 is partitioned into any desirable number of vertical slices (e.g., stripe 0, stripe 1, . . . , stripe m-1). In this example, the image 500, including N-lines (e.g., line 0, line 1, line n-1), is carved into M-vertical slices. Each vertical slice is referred as a stripe (e.g., a stripe image or data stripe). In one example, the image 500 is an m-sliced image, in which the line width of the image 500 is partitioned into m line segments, which may or may not equal the N-lines of the image 500. That is, the height of each stripe (e.g., stripe 0, stripe 1, . . . , stripe m-1), in most cases, matches the height of the image 500. There is, however, no restriction mandating every stripe having an equal width or having a height equal to the height of the image 500.

Figure 5B:
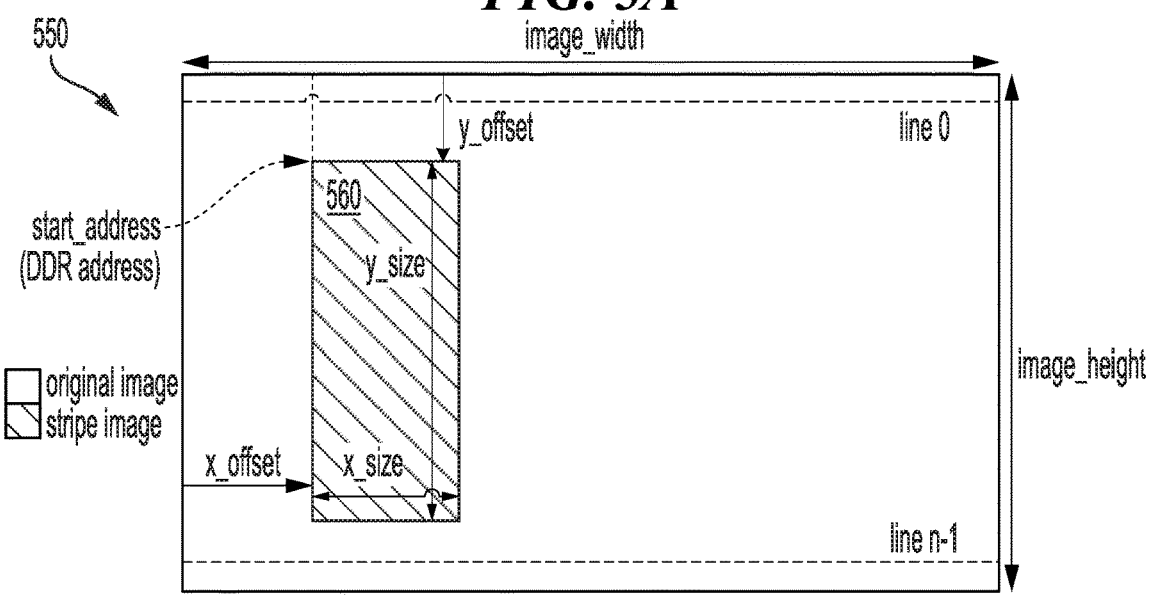
FIG. 5B is a block diagram illustrating parameters of a stripe image, according to aspects of the present disclosure.
Figure 5C:
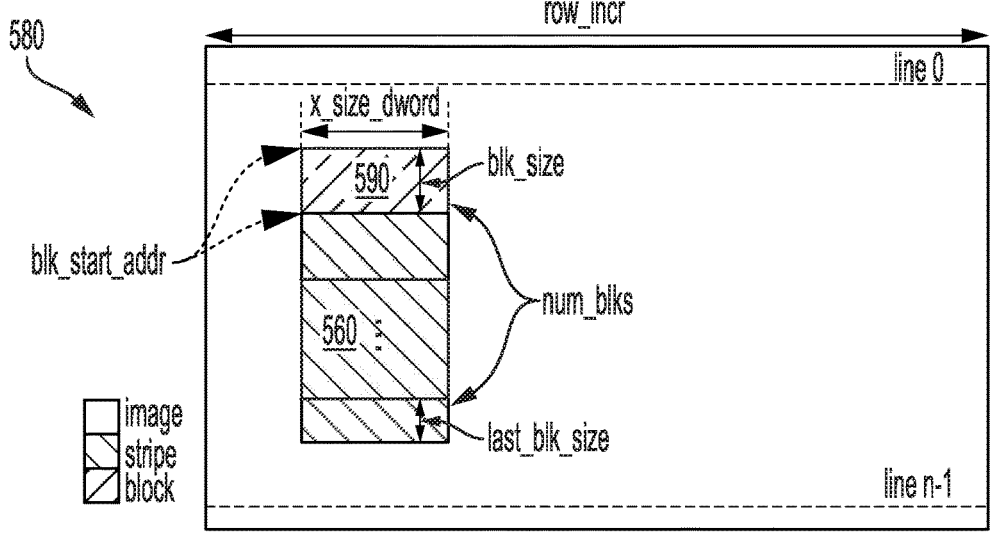
FIG. 5C is a block diagram illustrating further parameters of the stripe image of an original image of FIG. 5B, according to aspects of the present disclosure.

FIG. 5B is a block diagram illustrating parameters of a stripe image 560 of an original image 550, according to aspects of the present disclosure. Striping operates on an established coordinate system, allowing software users to specify the dimension and location of a sliced image (e.g., image 500 of FIG. 5A). The parameters of the stripe image 560 can be described in the context of high-level system design or a low-level hardware implementation. For example, from a high-level system perspective, the start location of the stripe image 560 may be specified in terms of an x_offset and a y_offset. The x_offset is the horizontal displacement between the left-most side of the stripe image 560 and the left-most side of the original image 550, measured in terms of pixels. The y_offset is the vertical displacement between the top-most side of the stripe image 560 and the top-most side of the original image 550, measured in terms of line numbers.

Additional parameters include an image_width (e.g., the width of the original image 550), image_height (e.g., the height of the original image 550), a start_address (e.g., the starting location (e.g., address) of the stripe in external memory), an x_size (e.g., the width of the stripe), and a y_size (e.g., the height of the stripe). While pixel and line representation is one option for specifying the location of the stripe image 560, this representation can be difficult and expensive to implement in hardware. For this reason, software users are expected to convert the parameters specified in a system domain into a hardware domain (e.g., the memory address of the pixel words) for reducing hardware complexity and cost. Regardless of the specified parameters, NDMA enables stripe read and stripe write for accessing NDMA data.

FIG. 5C is a block diagram 580 illustrating further parameters of the stripe image 560 of the original image 550 of FIG. 5B, according to aspects of the present disclosure. Conceptually, stripe-based processing is a subset of block-based processing. Consequently, the block parameters of the stripe image 560 may be specified in terms of a block 590, which is the smallest group of data moved by a single direct memory access (DMA) channel arbitration. The block parameters include a blk_start_addr, a blk_size, a last_blk_size, an x_side_dword, a num_blks parameter, and a row_incr parameter. The blk_start_addr parameter is the external memory address of each block at the start point. The blk_size and the last_blk_size parameters are used to define the size of the stripe image 560. The blocks of the stripe image 560 generally have the same size, except for the last block, which has the last_blk_size. The num_blks parameter indicates the number of blocks in the stripe image 560. The x_size_dword parameter is the word size of the block 590. The row_incr parameter is a block address increment used to determine a next block's address by adding to the previous start address (e.g., blk_start_addr). As described, address hopping is a data access technique for accessing blocks within a stripe image (e.g., 560).

During block streaming to stripe read and/or stripe write, data is saved to an external memory (e.g., double data rate (DDR) memory) in a 2D fashion. In particular, image data, such as the image 500 shown in FIG. 5A, is understood to represent a 2D format. During NDMA operation, a stripe of data can be accessed from the 2D data block (e.g., block 590 shown in FIG. 5C). In practice, data is stored in the external (e.g., DDR) memory using a contiguous address space. 2D and 3D data may be accessed using address hopping, for example, as shown in FIGS. 6A and 6B.

Figure 6A:
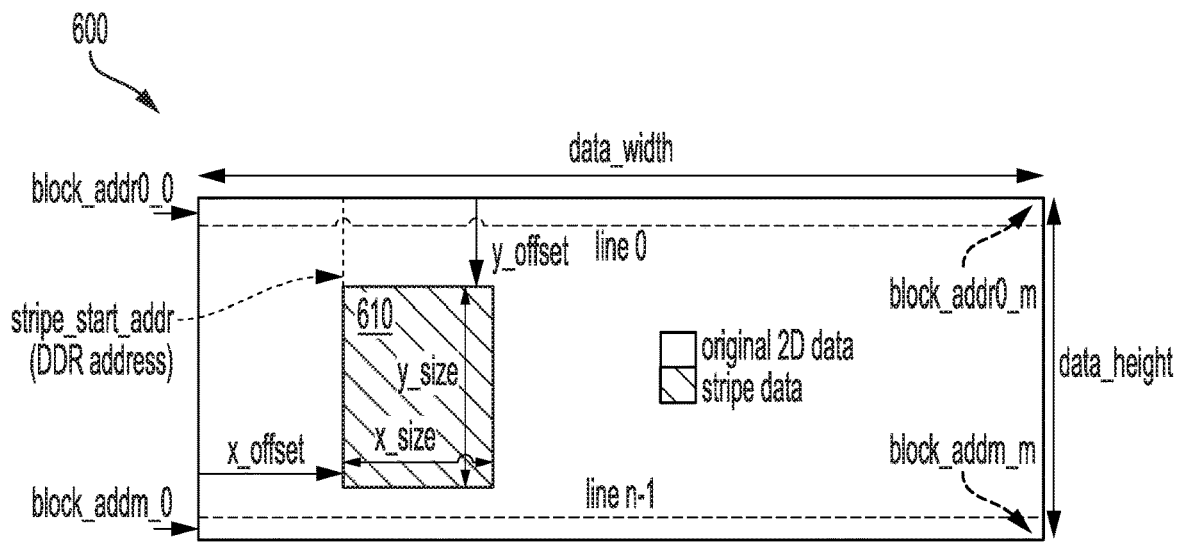
FIG. 6A is a block diagram illustrating storage of a two-dimensional (2D) data block in an external memory, according to aspects of the present disclosure.

FIG. 6A is a block diagram illustrating storage of a 2D data block 600 in an external memory, according to aspects of the present disclosure. The 2D data block 600 includes N-lines (e.g., line 0, . . . , line n-1) and is defined by a data_width parameter, a data_height parameter, and block address parameters (e.g., block_addr0_0, block_addr0_m, block_addrn_0, and block_addrn_m). The 2D data block 600 includes a stripe 610 defined by stripe_start_addr, x_offset, y_offset, x_size, and y_size parameters.

Figure 6B:
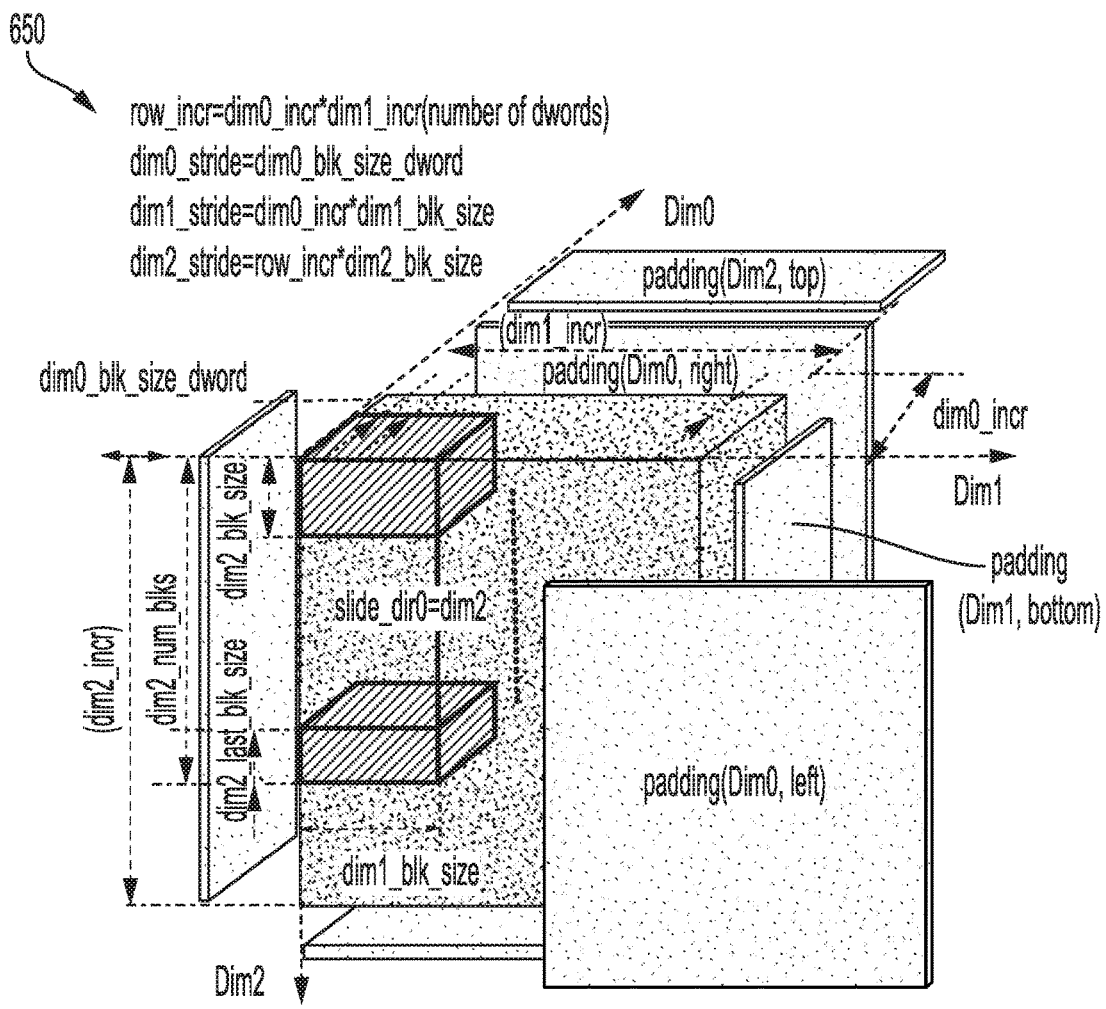
FIG. 6B is a block diagram illustrating a three-dimensional representation of image data, according to aspects of the present disclosure.

FIG. 6B is a block diagram illustrating a three-dimensional representation of image data, according to aspects of the present disclosure. Representatively, a 3D data structure 650 is shown. In this example, data is stored in an external memory in a raster order of lines in a Dim0 direction (in pixels), and continuously in a Dim1 direction. The 3D data storage is repeated over Dim0-Dim1 raster order in a Dim2 direction. The 3D data storage format can be described as a 3D array (e.g., DDR_data[dim2][dim1][dim0]). Data access to a stripe of 3D rectangular blocks is performed in a predetermined order, for example, by repeating access over the Dim0 and Dim1 directions, and proceeding in raster order over the Dim2 direction.

As described, Dim0 refers to a dimension that moves sequentially through contiguous NDMA words (e.g., a dword or a 256-bit word) in external memory; the term Dim1 refers to a dimension used when data is transferred in a 3D block (e.g., as shown in FIG. 6B), and the term Dim2 refers to a dimension used when data is transferred as a 2D or 3D block. As further described, the terms "lines" and "rows" are used interchangeably to describe aspects of the present disclosure because both terms refer to the lines of an image. Strictly speaking, however, "line" refers to the main image, while "row" refers to the lines contained in a given read buffer (e.g., one stripe). FIG. 6B also shows left padding (e.g., padding(Dim0, left)), right padding (e.g., padding(Dim0, right)), top padding (e.g., padding(Dim2, top)), and bottom padding (e.g., padding(Dim1, bottom)).

Figure 7:
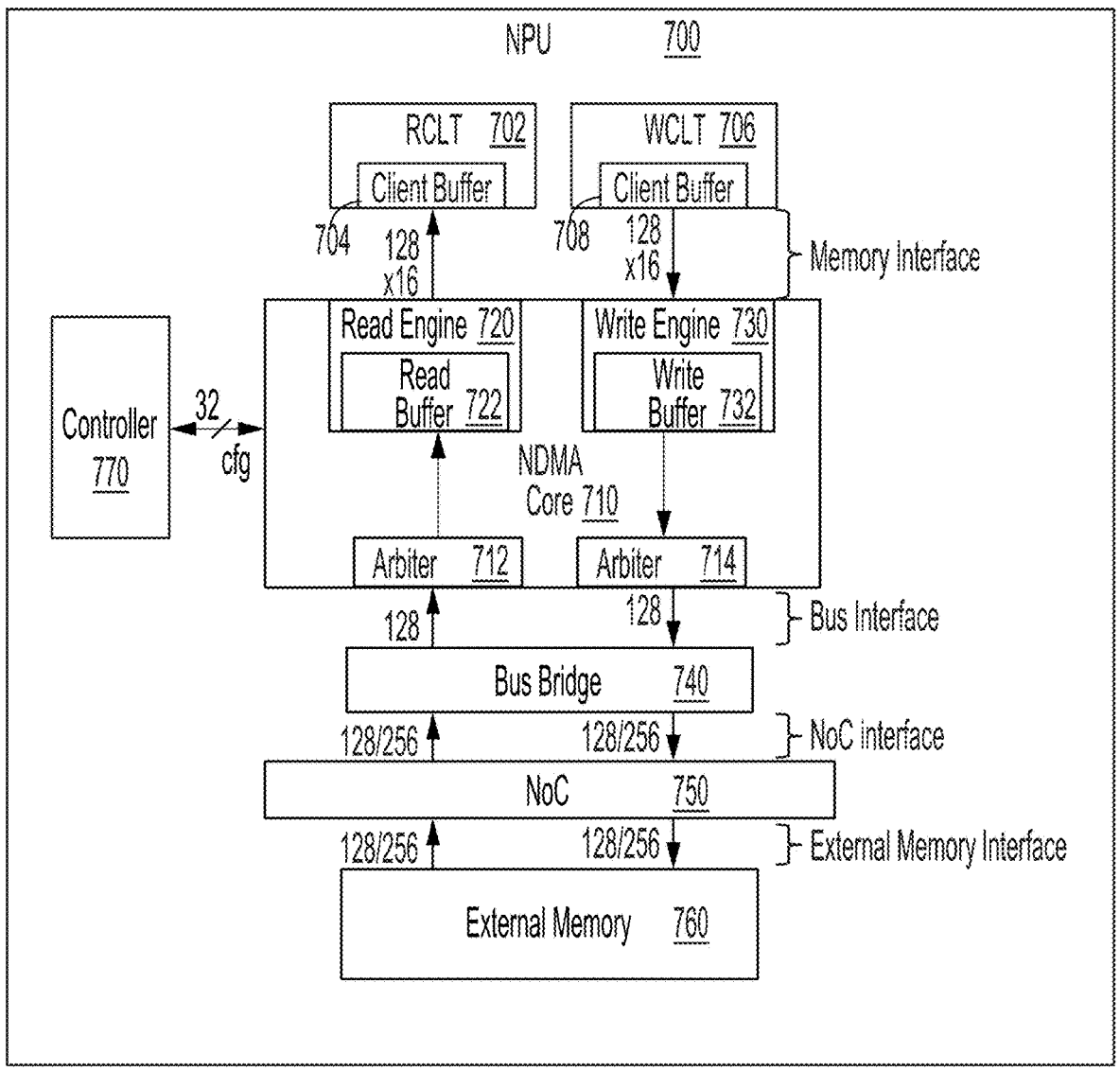
FIG. 7 is a block diagram illustrating a neural processing unit (NPU), including an NPU direct memory access (NDMA) core and interfaces configured to provide hardware pre-processing and post-processing of NDMA data, according to aspects of the present disclosure.

FIG. 7 is a block diagram illustrating an NPU 700, including an NPU DMA (NDMA) core 710 and interfaces configured to provide hardware pre-processing and post-processing of NDMA data, according to aspects of the present disclosure. The NDMA core 710 includes a read engine 720 configured to provide a first memory interface to a read client (RCLT) 702, including a client buffer 704, and a write engine 730 configured to provide a second memory interface to a write client (WCLT) 706, including a client buffer 708. The memory interfaces to the client side (e.g., RCLT, WCLT) are memory read/write interfaces using a request/valid handshake. In aspects of the present disclosure, the read client RCLT 702 and the write client WCLT 706 may refer to an array to compute elements of the NPU 700, which may support, for example, 16-NDMA read channels and 16-NDMA write channels for the various compute units of the NPU 700.

The NDMA core 710 also includes a bus interface (e.g., a synchronous media and switch fabric (MSF) interface) to a bus bridge 740. In this configuration, the NDMA core 710 is connected to the bus bridge 740 as well as a network on chip (NoC) 750, such as a multimedia subsystem (MMSS) NoC. The bus bridge 740 may be connected to the NoC 750 using, for example, an advance eXtensible interface (AXI). The NoC 750 may be connected to an external memory 760 (e.g., a DDR memory) through an external memory interface (e.g., an AXI bus).

In this configuration, the NDMA core 710 is partitioned into two major logic components; namely the write engine 730 and the read engine 720. The write engine 730 is configured to move processed client data to the external memory 760 in a stripe format (see FIGS. 5A-5C). On the other hand, the read engine 720 is configured to transfer fragmented data from the external memory 760 into client memories (e.g., read buffer 722 and/or write buffer 732) for image processing or for configuration. The write client WCLT and the read client RCLT are independent of each other.

As described, a write path implies an NDMA read from the write client WCLT and a write to the external memory 760, and a read path implies an NDMA read from the external memory 760 and a write to the read client RCLT. In addition, the terms "read path," "read client," and "read channel" are used interchangeably. The terms "write path," "write client," and "write channel" are also used interchangeably in this document.

In this aspect of the present disclosure, the NDMA core 710 avoids using large NDMA buffers. Instead, the NDMA core 710 may rely on client buffers of the read client RCLT and the write client WCLT for buffering NDMA data. This configuration provides flexibility by reusing the client's buffers from NDMA data transfer. In this configuration, the read engine 720 includes a read buffer 722 for storing (e.g., a bus width of) configuration data. The read engine 720 is configured to read 256-bits of configuration data from the read buffer 722 that is used for configuration of NDMA operation for the read client RCLT and/or the write client WCLT.

In operation, the read engine 720 retrieves (e.g., one bus width number of) bits of image data (e.g., NDMA data) from the external memory 760 and stores those bits in the read buffer 722. According to aspects of the present disclosure, the stored bits of image data may be subjected to hardware pre-processing and post-processing within the read buffer. As described, processing of MDMA data while stored in the read buffer 722 may refer to hardware pre-processing of the MDMA data, whereas processing of the MDMA data in the write buffer 732 may refer to hardware post-processing of the MDMA data.

Prior to performing the hardware pre-processing of the MDMA data, the read engine 720 reads out the bits of image data, and each pixel is unpacked to a byte boundary using, for example, 256-bit data words (e.g., dword format). The expected data format is limited by other applications that packed the image data. The read engine 720 adds correspond paddings (left, right, top, bottom or all around a cube) or crops out unused pixels for pre-processing of the MDMA data. Cropping is generally available for 2D or 3D data movement. In operation, the MDMA core 710 retrieves a full dword (e.g., 256-bit) from the external memory 760 and crops off unneeded pixels and re-aligns the pixels when writing to the read client RCLT. Cropping is also used to shift a block boundary when a stripe is in Dim0 direction and left padding is specified. For example, a left crop is limited to the first dword of the Dim0 line and a right crop is limited to the last dword of the Dim0 line.

Hardware pre-processing may include zero padding and non-zero padding, 2D padding or 3D padding, mirror padding, and/or group padding. The MDMA core 710 also supports data conversion from image format to NPU data types for a read operation with conversion back to image format for 2D and 3D storage. The NDMA core 710 also supports sign extension, such as sign or non-sign extending 8-bit per pixel (8 bpp) format to 16-bit per pixel (16 bpp) format. The read engine 720 sends the resultant data in a series of 256-bit words to the corresponding client memory destination locations.

As further shown in FIG. 7, the write engine 730 is configured to perform a 3D rectangle stripe write, a 2D rectangle stripe write, or a normal write to the external memory 760 in a streaming fashion (e.g., block by block). In this example, the write engine 730 is configured to retrieve 128-bits of data from the client buffer of the write client WCLT, pack to 64-bits word aligned (e.g., image pixel packing), form a dual word (128-bits) and write to the write buffer 732. When data in the write buffer 732 has reached a completed transaction size (e.g., the number of beats per transaction is programmable), this NDMA data is read out of the write buffer 732 and sent out to the bus bridge 740 through a write arbiter 714 to write to the external memory 760 as, for example, a 256-bit data word. The write arbiter 714 and a read arbiter 712 may operate according to a round robin arbitration between different NDMA read channels or NDMA write channels. The NDMA read channels and the NDMA write channels are independent.

A controller 770 is provided as a configuration interface of the NDMA core 710. In aspects of the present disclosure, the controller 770 configures parameters for block data movement. In addition, the controller 770 configures parameters for hardware pre-processing of NDMA data, including packing, unpacking, padding, and cropping. The controller 770 may configure registers (e.g., register ports) of the NPU 700 to direct the NDMA core 710 during hardware pre-processing and post-processing of the NDMA. For example, pre-processing of NDMA data for pixel padding is performed for image processing modules that specify color information from previous lines or pixels to initiate their image processing task on the edges of the original image or stripes. Padding is also performed to maintain input feature size during convolution, for example, as shown in FIGS. 8A and 8B.

Figure 8A:
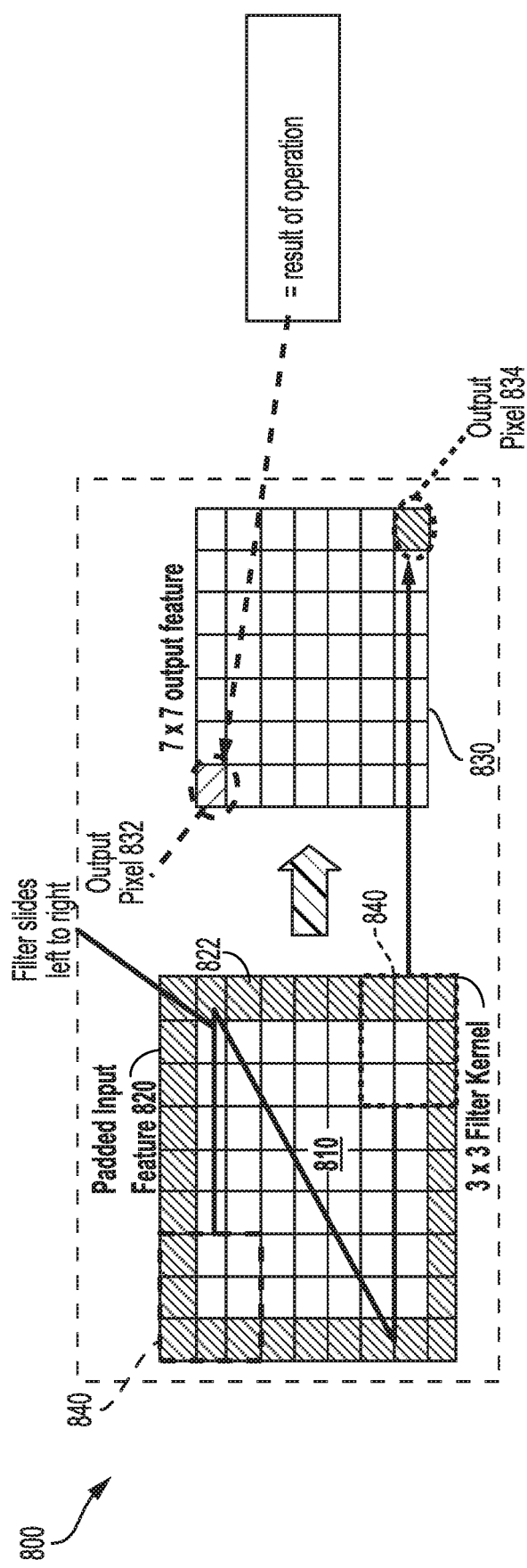
FIGS. 8A and 8B are block diagrams illustrating padding types as well as padding of an input feature to maintain an input feature size during an operation using a filter, according to aspects of the present disclosure.
Figure 8B:
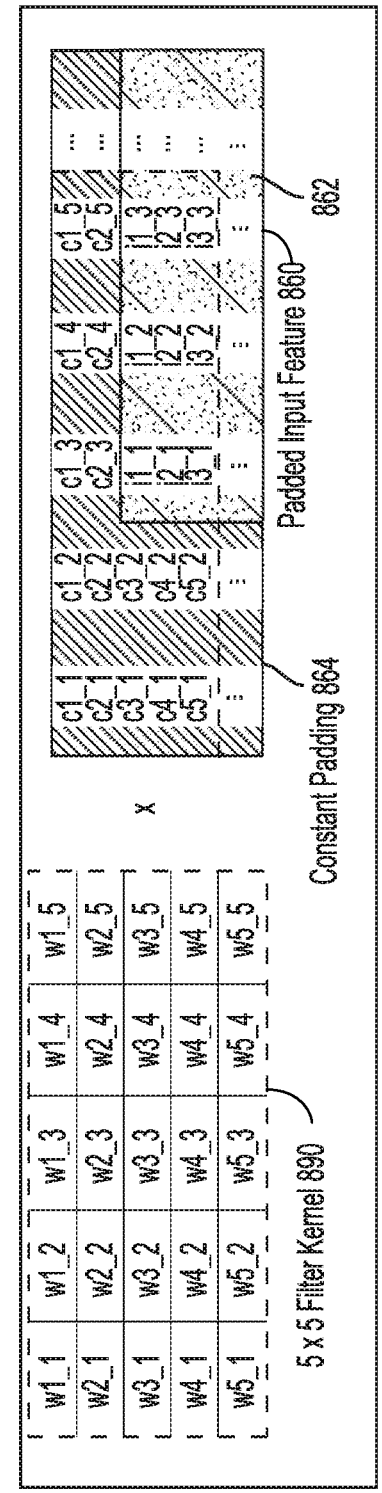

FIGS. 8A and 8B are block diagrams 800 and 850 illustrating padding of an input feature to maintain an input feature size during an operation (e.g., a multiply-accumulate (MAC) operation) using a filter, according to aspects of the present disclosure. In the block diagram 800 of FIG. 8A, a padded input feature 820 is shown. In this example, a 7×7 input feature 810 is padded with a single layer of padding 822 to form the padded input feature 820. The padding 822 added to the 7×7 input feature 810 is used to maintain the original size of the 7×7 input feature 810 during processing through a convolutional layer using a 3×3 filter kernel 840 to produce a 7×7 output feature 830.

As shown in FIG. 8A, the padded input feature 820 is processed by applying the 3×3 filter kernel 840 to 3×3 areas of the padded input feature 820. In this example, a first 3×3 area of the padded input feature 820 is multiplied and accumulated with the 3×3 filter kernel 840 to compute a first output pixel 832 of a 7×7 output feature 830 (e.g., matrix multiplication). This process is repeated as the 3×3 filter kernel 840 slides left to right until a last 3×3 area of the padded input feature 820 is processed to compute a final output pixel of the 7×7 output feature 830. That is, the weights in the 3×3 filter kernel 840 are multiplied by the 3×3 areas in the padded input feature 820. The results from multiplying the 3×3 filter kernel 840 to the 3×3 areas of the padded input feature 820 are output to a new pixel (e.g., 832, 834) of the 7×7 output feature 830.

FIG. 8B is a block diagram 850 illustrating multilayer padding of a padded input feature 860 to maintain an input feature size during multiply-accumulate (MAC) operations using a 5×5 filter kernel 890, according to aspects of the present disclosure. In this example, the padded input feature 860 is composed of input feature values 862 (i1_1, i1_2, ..., i3_3) and padding values 864, which illustrate a multilayer (e.g., =two layer) constant padding type. The padding values 864 may be added during hardware pre-processing and/or post-processing by the NDMA core 710 shown in FIG. 7. Although shown using the constant padding type, it should be recognized that other padding types are contemplated, including zero padding type, reflective mirror padding type, symmetric mirror padding type, and edge mirror padding type. For example, the mirror padding type may be beneficial for image processing modules due to the absence of true pixels beyond the boundary of an original image.

In neural networks, padding is a layer pre-processing technique that is generally inefficient to perform using software. According to aspects of the present disclosure, software is used to program hardware configuration registers to direct the NDMA core 710 to perform hardware pre-processing and post-processing of NDMA, for example, as described in FIG. 9.

Figure 9:
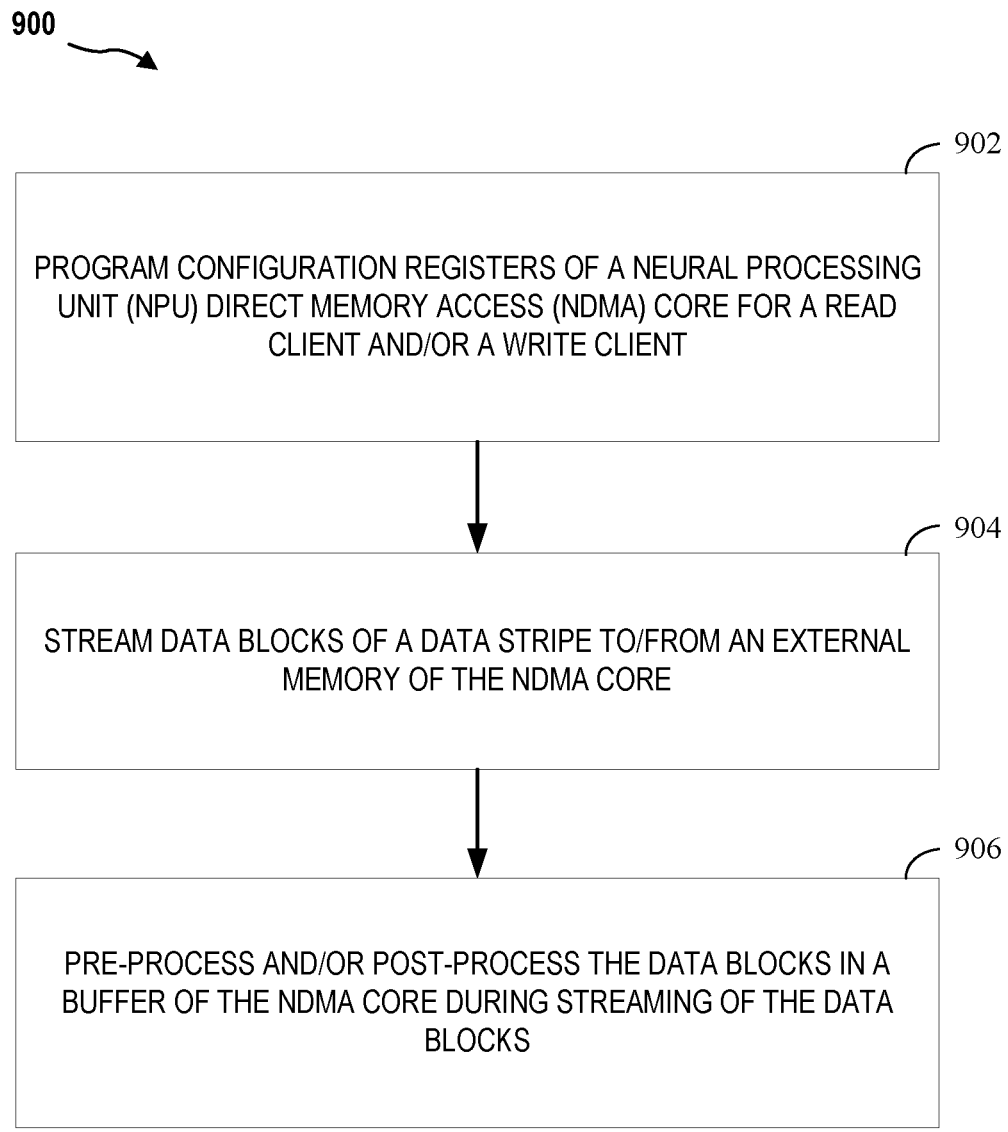
FIG. 9 illustrates a method for performing hardware pre-processing and post-processing of neural processing unit (NPU) direct memory access (NDMA) data, in accordance with aspects of the present disclosure.

FIG. 9 illustrates a method for hardware pre-processing and post-processing of neural processing unit (NPU) direct memory access (NDMA) data, in accordance with aspects of the present disclosure. A method 900 begins at block 902, in which configuration registers of a neural processing unit (NPU) direct memory access (NDMA) core are programmed for a read client and/or a write client. The read client and/or the write client may be compute units of the NPU 700 shown in FIG. 7. At block 904, data blocks of a data stripe are streamed to/from an external memory of the NDMA core. For example, FIG. 7 shows streaming of a data stripe to/from the external memory. In particular, data blocks are streamed between the read client RCLT and/or write client WCLT to/from the external memory 760. At block 906, the data blocks in a buffer of the NDMA core are pre-processed and/or post-processed during streaming of the data blocks. For example, pre-processing and/or post-processing of NDMA data may be performed as shown in FIGS. 8A and 8B.

Figure 10:
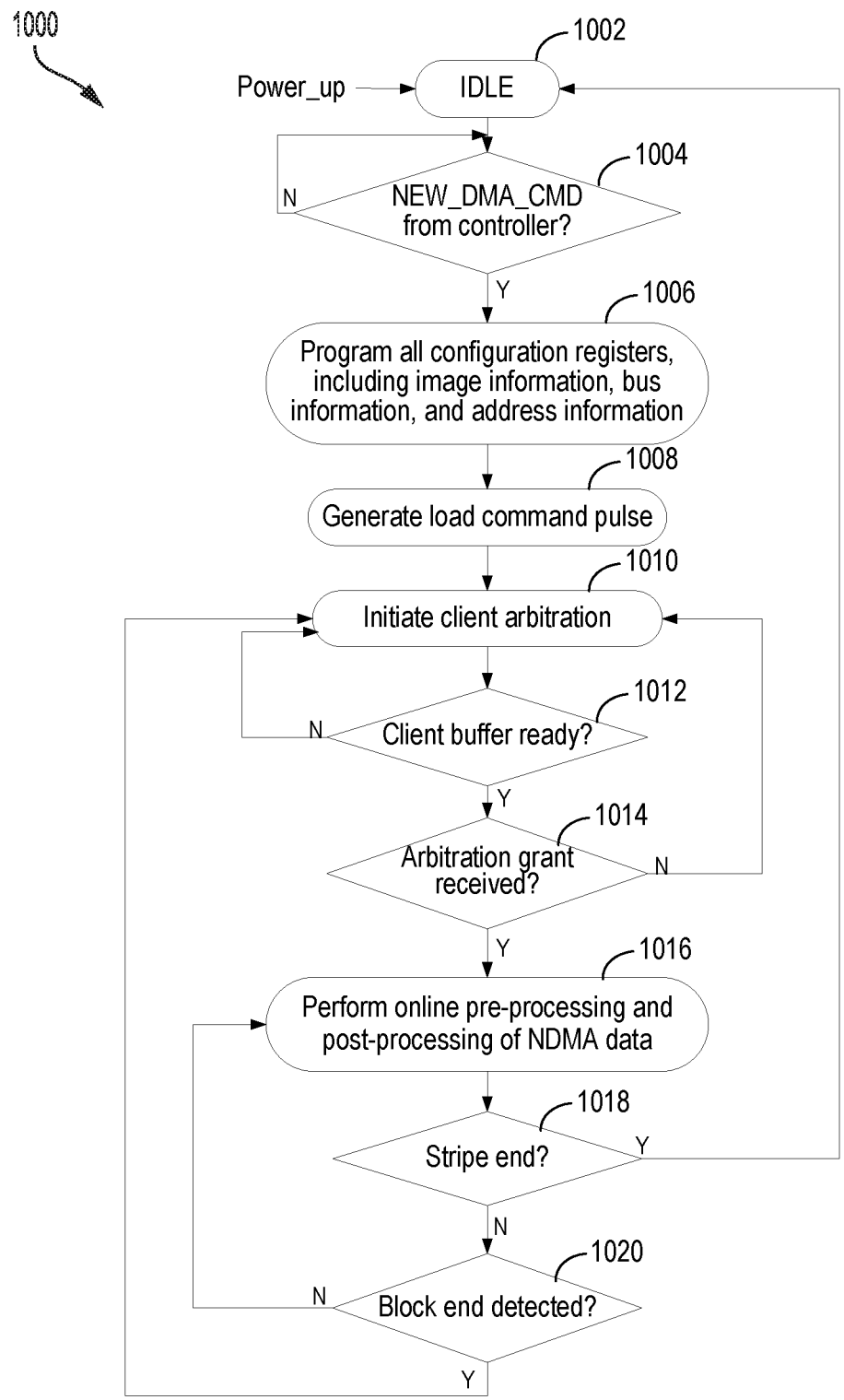
FIG. 10 illustrates a method for further performing hardware pre-processing and post-processing of neural processing unit (NPU) direct memory access (NDMA) data, in accordance with aspects of the present disclosure.

FIG. 10 further illustrates a method for hardware pre-processing and post-processing of neural processing unit (NPU) direct memory access (NDMA) data, in accordance with aspects of the present disclosure. A method 1000 begins at block 1002, in which a neural processing unit (NPU) direct memory access (NDMA) core is idle after power up. At block 1004, an NDMA core determines whether a new direct memory access (DMA) command from a controller is received. Once received, at block 1006, all configuration registers are programmed to define, for example, image information, bus information, and address information. Once programmed, at block 1008, a load command pulse is generated. In response, at block 1010, client arbitration is initiated. Once initiated, at block 1012, it is determined whether a client buffer is ready. Once the client buffer is ready, at block 1014, it is determined whether an arbitration grant (arb_gnt) is received.

For example, as shown in FIG. 7, detection of the load command for either the read client RCLT or the write client WCLT triggers initial arbitration using the read arbiter 712 or the write arbiter 714. While the arbitration is requested, the NDMA core determines whether the client buffer of the read client RCLT or the write client WCLT is ready depending on whether the read client RCLT or the write client WCLT is the target of the load command.

Referring again to FIG. 10, once the arbitration is granted, at block 1016, hardware pre-processing and/or post-processing of NDMA data is performed. For example, as shown in FIG. 7, a read engine 720 of the NDMA core 710 retrieves a predetermined number of bits (e.g., a bus width) of image data (e.g., NDMA data) from the external memory 760 and stores those bits in the read buffer 722 of the NDMA core. According to aspects of the present disclosure, the stored NDMA data in the read buffer 722 may be subjected to hardware pre-processing and post-processing. For example, the hardware pre-processing may include padding of an input tensor, as shown in FIGS. 8A and 8B. The method 1000 may further include unpacking NDMA data during streaming of the data blocks from the external memory, and repacking the NDMA data prior to streaming data blocks to the external memory hardware. Pre-processing of the NDMA data using the hardware of the NDMA core 710 is substantially more efficient compared with conventional software pre-processing and post-processing.

In aspects of the present disclosure, one block of NDMA data is processed for each bus transaction. In addition, the single NDMA command involves a stripe data that is provided by streaming the data blocks of the stripe data. As shown in FIG. 10, at block 1018, it is determined whether a complete stripe is processed (e.g., stripe end). Once the complete stripe is processed, the method 1000 returns to the idle state at block 1002 until another NDMA command is received. Otherwise, at block 1020 it is determined whether an end of a current block is detected. Once detected, control flow returns to block 1010, in which the method 1000 waits for client arbitration.

In some aspects, the methods 900, 1000 may be performed by the NPU 108 (FIG. 1) and/or the NPU 700 (FIG. 7). That is, each of the elements of methods 900, 1000 may, for example, but without limitation, be performed by the NPU 108 or the NPU 700, including the NDMA core 710 and/or other included components.

Aspects of the present disclosure are directed to neural processing unit (NPU) direct memory access (NDMA) hardware pre-processing and post-processing of NDMA data for convolutional neural networks. NDMA moves NDMA data from main memory to storage closer to the compute units of an NPU for local storage to perform pre-processing and post-processing of the NDMA data. NDMA hardware pre-processing and post-processing is software programmable by programming configuration registers to control NDMA operation, resulting in better resource utilization and energy efficiency. Adding hardware pre-processing and post-processing capability to an NPU reduces memory bandwidth pressure and wasted cycles in compute units of the NPU.

An artificial neural network model includes means for programming configuration registers of an NPU, means for streaming data blocks of a data stripe, and/or means for pre-processing and post-processing data blocks in an NDMA core. In one aspect, the programming means, streaming means, and/or pre-processing and post-processing means may be the NPU 108, program memory associated with the NPU 108, memory block 118, NPU 700 and the NDMA core 710 configured to perform the functions recited. The means for pre-processing and post-processing of data blocks in a buffer of the NDMA core includes means for padding NDMA data, means for cropping NDMA data, means for sign extending NDMA data, means for unpacking NDMA data and/or means for repacking NDMA data prior to streaming. In one aspect, the padding means, the cropping means, the sign extending means, the unpacking means, and/or the repacking means may be the NPU 108, program memory associated with the NPU 108, the memory block 118, the NPU 700, and the NDMA core 710 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A neural processing unit (NPU) chip, comprising:
an NPU direct memory access (NDMA) core comprising:
a read engine having a read buffer; and
a write engine having a write buffer;
a bus bridge coupled to the NDMA core;
a network on chip (NoC) coupled to the bus bridge;
a write client coupled to a first memory interface of the NDMA core, the write client comprising a write client buffer used to store NDMA data of the NDMA core;
a read client coupled to a second memory interface of the NDMA core, the read client comprising a read client buffer used to store the NDMA data of the NDMA core; and
a controller coupled to the NDMA core and configured to direct the NDMA core to move data stripes of an image, block by block, from external memory to the read buffer and to the external memory from the write buffer, and configured to direct the NDMA core to perform hardware pre-processing of NDMA data before the read client buffer and post-processing of NDMA data in the write buffer on blocks of a data stripe to process tensors in artificial neural networks.

2. The NPU chip of claim 1, further comprising:
a read arbiter coupled to the read engine;
a write arbiter coupled to the write engine; and
the external memory coupled to the read arbiter and the write arbiter.

3. The NPU chip of claim 2, in which the bus bridge is coupled between the external memory and the read arbiter and the write arbiter.

4. The NPU chip of claim 3, in which the network on chip (NoC) is coupled between the external memory and the bus bridge.

5. The NPU chip of claim 1, in which the controller is configured to direct the NDMA core to pad the NDMA data in the read buffer and/or the write buffer.

6. The NPU chip of claim 1, in which the controller is configured to direct the NDMA core to crop the NDMA data in the read buffer and/or the write buffer.

7. The NPU chip of claim 6, in which the controller is configured to direct the NDMA core to sign extend the NDMA data in the read buffer and/or the write buffer.

8. A method for hardware pre-processing and post-processing of direct memory access (DMA) data in artificial neural networks, comprising:
programming configuration registers of a neural processing unit (NPU) direct memory access (NDMA) core for a read client and/or a write client;
streaming data blocks of a data stripe of an image, block by block, over a bus bridge and a network on chip (NoC) between external memory and the NDMA core; and
pre-processing and post-processing the data blocks in buffers of the NDMA core during streaming of the data blocks between the external memory and the read client and/or write client.

9. The method of claim 8, in which pre-processing and post-processing comprises padding NDMA data in a read buffer and/or a write buffer during streaming of the data blocks.

10. The method of claim 8, in which pre-processing and post-processing comprises cropping NDMA data in a read buffer and/or a write buffer during the streaming of the data blocks.

11. The method of claim 8, in which pre-processing and post-processing comprises sign extending NDMA data in a read buffer and/or a write buffer during streaming of the data blocks.

12. The method of claim 8, further comprising:
unpacking NDMA data during the streaming of data blocks of the data stripe to/from the external memory; and
repacking NDMA data prior to the streaming of data blocks of the data stripe to the external memory.

13. An artificial neural network for hardware pre-processing and post-processing of direct memory access (DMA) data, the artificial neural network comprising:
means for programming configuration registers of a neural processing unit (NPU) direct memory access (NDMA) core for a read client and/or a write client;
means for streaming data blocks of a data stripe of an image, block by block, over a bus bridge and a network on chip (NoC) between external memory and the NDMA core; and
means for pre-processing and post-processing data blocks of the data stripe in buffers of the NDMA core during the streaming of data blocks of the data stripe between the external memory and the read client and/or write client.

14. The artificial neural network of claim 13, in which the means for pre-processing and post-processing comprises means for padding NDMA data in a read buffer and/or a write buffer during the streaming of data blocks of the data stripe.

15. The artificial neural network of claim 13, in which the means for pre-processing and post-processing comprises means for cropping NDMA data in a read buffer and/or a write buffer during the streaming of data blocks of the data stripe.

16. The artificial neural network of claim 13, in which the means for pre-processing and post-processing comprises means for sign extending NDMA data in a read buffer and/or a write buffer during the streaming of data blocks of the data stripe.

17. The artificial neural network of claim 13, further comprising:
means for unpacking NDMA data during the streaming of data blocks of the data stripe to/from the external memory of the NDMA core; and
means for repacking NDMA data prior to the streaming of data blocks of the data stripe to/from the external memory.

18. A non-transitory computer-readable medium having program code recorded thereon for hardware pre-processing and post-processing of direct memory access (DMA) data in an artificial neural network, the program code being executed by a processor and comprising:
program code to program configuration registers of a neural processing unit (NPU) direct memory access (NDMA) core for a read client and/or a write client;
program code to stream data blocks of a data stripe of an image, block by block, over a bus bridge and a network on chip (NoC) between an external memory and the NDMA core; and
program code to pre-process and post-process the data blocks of the data stripe in buffers of the NDMA core during streaming of the data blocks of the data stripe between the external memory and the read client and/or write client.

19. The non-transitory computer-readable medium of claim 18, in which the program code to pre-process and post-process comprises program code to pad NDMA data in a read buffer and/or a write buffer during the program code to stream the data blocks.

20. The non-transitory computer-readable medium of claim 18, in which the program code to pre-process and post-process comprises program code to crop NDMA data in a read buffer and/or a write buffer during the program code to stream the data blocks.

21. The non-transitory computer-readable medium of claim 18, in which the program code to pre-process and post-process comprises program code to sign extend NDMA data in a read buffer and/or a write buffer during streaming of the data blocks.

22. The non-transitory computer-readable medium of claim 18, further comprising:
program code to unpack NDMA data during streaming of the NDMA data from the external memory; and
program code to repack the NDMA data prior to streaming the data blocks to the external memory.

* * * * *